H. B. GILLETTE.
PNEUMATIC TIRE.
APPLICATION FILED DEC. 6, 1913.
1,141,537.
Patented June 1, 1915.
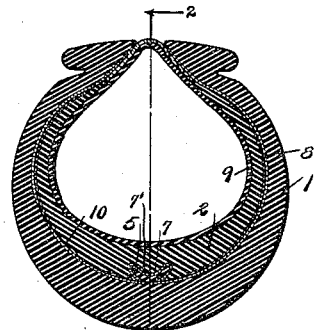
Fig. I.
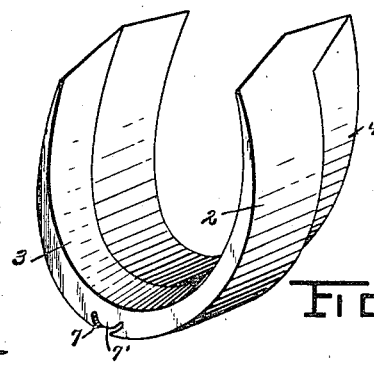
Fig. III.
Fig. V.
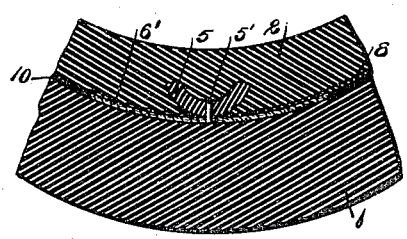
Fig. VI.
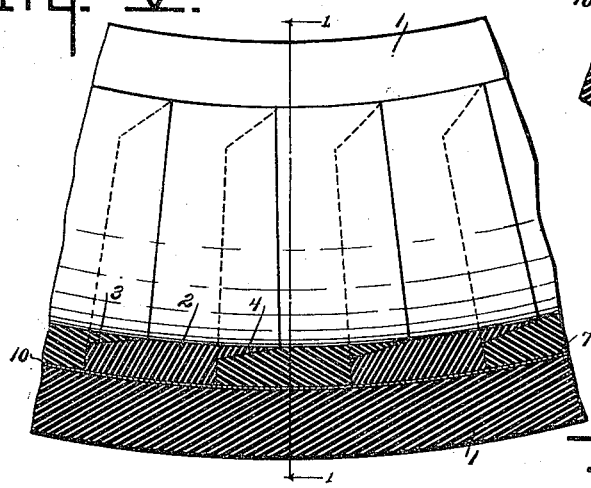
Fig. II.
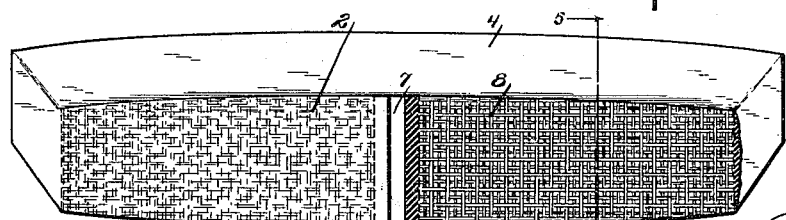
Fig. IV.
Witnesses
C. B. des Jardins
M. L. Glasgow
Inventor
Herbert B. Gillette
By Chappell & Earl
Attorneys

UNITED STATES PATENT OFFICE.

HERBERT B. GILLETTE, OF GRAND RAPIDS, MICHIGAN.

PNEUMATIC TIRE.

1,141,537.   Specification of Letters Patent.   Patented June 1, 1915.

Continuation of applications Serial No. 724,499, filed October 8, 1912, and Serial No. 760,141, filed April 10, 1913. This application filed December 6, 1913. Serial No. 805,177.

*To all whom it may concern:*

Be it known that I, HERBERT B. GILLETTE, a citizen of the United States, residing at the city of Grand Rapids, county of Kent, State of Michigan, have invented certain new and useful Improvements in Pneumatic Tires, of which the following is a specification.

This invention relates to improvements in pneumatic tires, and particularly to protection structures therefor.

The objects of this invention are,

First, to provide in a protector means for pneumatic tires, an effective means of retaining and securing a segmental jointed soft rubber protector in place. Second, to provide improved means of retaining the form of such soft rubber protectors when they are incorporated in a tire. Third, to provide improved construction of retaining ribs for such jointed soft rubber protectors. Fourth, to provide such a protector and retaining device which may be readily attached to tires already in use.

Further objects and objects relating to details and economies of construction and operation will definitely appear from the description to follow.

I accomplish the objects of my invention by the devices and means described in the following specification.

The invention is clearly defined and pointed out in the claims.

Structures which are preferred embodiments of my invention are clearly illustrated in the accompanying drawing, forming a part of this specification, in which:

Figure I is a transverse detail sectional view through a pneumatic automobile tire incorporating my invention, taken on a line corresponding to line 1—1 of Fig. II. Fig. II is an enlarged detail longitudinal sectional view through a portion of a tire incorporating my invention, taken on a line corresponding to line 2—2 of Fig. I. Fig. III is a detail perspective view of one of the jointed segments of my improved tire protector, somewhat as it is conformed and shaped when in place in a tire. Fig. IV is a detail plan view of one of my improved protector segments as it is molded in the flat, a portion of the rubber being cut away at one side of the attaching groove to show the armor fabric therein. Fig. V is an enlarged detail sectional view taken on a line corresponding to line 5—5 of Fig. IV, showing the general formation of the protector segment in cross section. Fig. VI is an enlarged detail transverse sectional view through the central portion of one of my improved protector segments in place in a tire, with a modified means for attaching to the outer casing, showing the same as it is made use of as an attachment for tires already in use.

In the drawing, the sectional views are taken looking in the direction of the little arrows at the ends of the section lines and similar numerals of reference refer to similar parts throughout the several views.

Considering the numbered parts of the drawing, I have shown my invention incorporated in an ordinary pneumatic automobile tire. The casing 1 is of any desired form, and the inner tube 9 is of any usual or desired construction. I have not shown the parts in place on a rim, as that is unnecessary to understand my invention. My improved protector segments 2 are interposed between the casing and the inner tube, and are thickest at their central portion, which is toward the periphery of the tire, as clearly appears in Figs. I and III.

The segments are provided with joint tongues or flaps 4 projecting from one edge on their inner sides, which are beveled to a thin knife edge, as appears in cross section in Fig. V, this portion conforming to the inner tube 9. The opposite inner side of each segment is correspondingly beveled as at 3 to receive the joint tongue or flap 4. These segments are disposed on a continuous annular retainer 5, which is secured centrally within the shoe 1 opposite its outermost periphery. This retainer rib is preferably in cross section in the form of a segment of a circle, being preferably made from a piece of high pressure steam hose made up of fabric and rubber. A section or segment of the tube is cut lengthwise and then incorporated into the lining fabric 10 of the outer tube 1 which continues therearound, as seen in Fig. I.

A segmental longitudinal notch 7 is in each protector segment 2 and embraces the rib or annular ring within the tire casing 1. Because of the formation of the same, the projecting portion 7' (see Fig. III) exactly conforms to the interior portion of the said rib 5, and the lateral sides of the notch 7 very effectively embrace the projecting edges of the retaining rib 5, so that heavy pressure thereon causes the same to more effectively grasp the retainer rib 5. The preferred form appears in Fig. I. A form which I have found highly satisfactory is seen in Fig. VI, in which a piece of gummed tape 6' is stitched at 5' to the retaining rib 5, and this gummed tape 6' is cemented to the inside of the shoe 1. So that the soft rubber segment 2 will remain effectively in position, I incorporate into the same at each side of the notch 7 a coarse woven armor fabric 8, technically known in the tire art as a breaker strip, which retains the rubber effectively in place and prevents its pressing out at each side and insures the proper resistance to any object that may have punctured the outer casing, and insures a broad resistance of the soft rubber when a pointed object comes to enter the protector. This is what turns the point of a nail or other puncturing object and prevents its penetrating the inner tube.

I have shown my improved tire structure in the forms preferred by me, which I desire to claim specifically. I am aware that the same can be considerably modified in detail without departing from my invention, and I therefore desire also to claim the same broadly, as indicated and pointed out in the appended claims.

Having thus described my invention, what I claim as new and desire to secure by Letters Patent is:

1. In a pneumatic tire structure, the combination of an outer casing, an inner tube, a retaining rib curved in cross section secured centrally to the inside of the wall of the said outer casing, protector segments of soft rubber thick at the center and extended to thin edges at each side, with central longitudinal arc shaped notches adapted to engage said rib, said segments being provided with beveled joint flaps on one edge at their inner sides and with beveled portions corresponding to said flaps at the opposite edges, disposed upon said rib, and a breaker strip of fabric incorporated in the outer portion of said soft rubber segments at each side of the engaging notch, coacting substantially as described for the purpose specified.

2. In a pneumatic tire structure, the combination of an outer casing, an inner tube, a retaining rib curved in cross section secured centrally to the inside of the wall of the said outer casing, protector segments of soft rubber thick at the center and extended to thin edges at each side, with central longitudinal arc shaped notches adapted to engage said rib, said segments being provided with beveled joint flaps on one edge at their inner sides and with beveled portions corresponding to said flaps at the opposite edges, disposed upon said rib, and fabric incorporated in the outer portion of said soft rubber segments at each side of the engaging notch, coacting substantially as described for the purpose specified.

3. In a pneumatic tire structure, the combination of an outer casing, an inner tube, a retaining rib curved in cross section secured centrally to the inside of the wall of the said outer casing, and protector segments of soft rubber thick at the center and extended thin edges at each side, with central arc shaped notches adapted to engage said rib, said segments being provided with beveled joint flaps on one edge at their inner sides and with beveled portions corresponding to said flaps at the opposite edges, disposed upon said rib, coacting substantially as described for the purpose specified.

4. In a pneumatic tire structure, the combination of an outer casing, an inner tube, a retaining rib curved in cross section secured centrally to the inside of the wall of the said outer casing, a gummed strip cemented in said tire to which said rib is stitched, and protector segments of soft rubber thick at the center and extended to thin edges at each side, with central longitudinal arc shaped notches adapted to engage said rib, said segments being provided with beveled joint flaps on one edge at their inner sides and with beveled portions corresponding to said flaps at the opposite edges, disposed upon said rib coacting substantially as described for the purpose specified.

5. In a pneumatic tire structure, the combination with the outer casing, of a retaining rib curved in cross section, secured centrally to the inside wall of the outer casing.

6. In a pneumatic tire structure, a retaining rib curved in cross section, and a strip centrally stitched thereto adapted to be cemented to the outer casing of a tire.

7. In a pneumatic tire structure, a protector segment of soft rubber thick at the center and extended to a thin edge at each side, with central longitudinal notch, and a breaker strip of fabric incorporated in the outer portion thereof, said segment being normally flat and adapted to be flexed into crescent shape.

8. In a pneumatic tire structure, the combination of an outer casing, an inner tube, a retaining rib secured to the inner wall of said outer casing, resilient protector strips disposed in flexed condition between said outer casing and said inner tube, said strips tending to spring out into the flat position, notches in said protector strips, said protector strips being seated on said rib with the notches engaging said rib when the strips are flexed, the resiliency of the protector strips causing the notches to grip said rib.

9. In a pneumatic tire structure, the combination of an outer casing, an inner tube, a retaining rib secured to the inner wall of said outer casing, resilient protector strips secured to said rib in a flexed position, and tending to regain the flat position, the resiliency of said protector strips causing them to exert outward pressure against the inner face of said outer casing.

10. In a pneumatic tire structure, the combination of an outer casing, an inner tube, resilient protector strips disposed in flexed condition between said outer casing and the inner tube, said strips being normally flat and being disposed beneath said outer casing in a flexed position having a tendency to regain the flat position, the resiliency of said protector strips exerting outward pressure against the inner face of the outer casing to retain said strips in place, all coacting substantially as described for the purpose specified.

11. In a pneumatic tire structure, the combination of an outer casing, an inner tube, interlapping protector segments of soft flexible rubber flexed from their normal position into substantially crescent shape and disposed between said outer casing and said inner tube around the periphery of the tire.

In witness whereof, I have hereunto set my hand and seal in the presence of two witnesses.

HERBERT B. GILLETTE. [L. S.]

Witnesses:
LUELLA G. GREENFIELD,
GRACE B. THOMPSON.

Copies of this patent may be obtained for five cents each, by addressing the "Commissioner of Patents Washington, D. C."